United States Patent [19]
Lee et al.

[11] Patent Number: 6,128,724
[45] Date of Patent: Oct. 3, 2000

[54] COMPUTATION USING CODES FOR CONTROLLING CONFIGURABLE COMPUTATIONAL CIRCUIT

[75] Inventors: Tsung-En Andy Lee, Sunnyvale; Donald C. Cox, Stanford, both of Calif.

[73] Assignee: Leland Stanford Junior University, Palo Alto, Calif.

[21] Appl. No.: 08/988,703

[22] Filed: Dec. 11, 1997

[51] Int. Cl.⁷ .................................................. G06F 15/00
[52] U.S. Cl. .................................. 712/32; 712/1; 717/5; 717/6
[58] Field of Search ................... 395/800.01, 800.16, 395/800.23, 800.32, 705, 706; 712/1, 16, 23, 32; 717/5, 6

[56] References Cited

U.S. PATENT DOCUMENTS

| | | | |
|---|---|---|---|
| 4,346,438 | 8/1982 | Potash et al. | 712/22 |
| 4,937,872 | 6/1990 | Hopfield et al. | 704/232 |
| 4,964,035 | 10/1990 | Aoyama et al. | 712/3 |
| 4,967,340 | 10/1990 | Dawes | 712/37 |
| 5,121,498 | 6/1992 | Gilbert et al. | 395/708 |
| 5,357,152 | 10/1994 | Jennings, III et al. | . |
| 5,394,030 | 2/1995 | Jennings, III et al. | . |
| 5,428,808 | 6/1995 | Sawase et al. | 712/19 |
| 5,596,766 | 1/1997 | Jennings, III et al. | . |
| 5,758,174 | 5/1998 | Crump et al. | 713/324 |
| 5,784,636 | 7/1998 | Rupp | 712/22 |

FOREIGN PATENT DOCUMENTS

WO 93 10496   5/1993   WIPO .

OTHER PUBLICATIONS

Hamacher et al. (Computer Organization McGraw–Hill Book Company Copyright 1984).

J.E. Smith et al., "Varieties of Decoupled Access/Execute Computer Architectures," *Proceedings Twentieth Annual Allerton Conference on Communication, Control and Computing*, Oct. 1982, pp. 577–586, XP000212152, Monticello, Illinois, USA.

C.E. Love et al., "An Investigation of Static Versus Dynamic Scheduling," *Proceedings of the Annual International Symposium on Computer Architecture*, Seattle, May 28–31, 1990, No. SYMP.17, May 28, 1990, pp. 192–201, XP000144796, Institute of Electrical and Electronics Engineers.

L. Kurian et al., "Memory Latency Effects in Decoupled Architectures," *IEEE Transactions on Computers*, vol. 43, No. 10, Oct. 1, 1994, pp. 1129–1139, XP000474484.

D. Probert et al., "A Straightforward Implementation of 4.2BSD on a High–Performance Multiprocessor," *USENIX Technical Conference*, Jan. 1, 1986, pp. 140–156, XP000284852.

*Primary Examiner*—Meng-Ai T. An
*Assistant Examiner*—Mackly Monestime
*Attorney, Agent, or Firm*—Crawford PLLC

[57] ABSTRACT

A micro-computer is arranged to execute instructions for data intensive applications, such as those used in mobile communications. One particular embodiment involves processing instructions into computational codes and data management codes. These two parts are coded separately and issued to two different program decoders in parallel. Computational codes control the computational units with register-to-register data movement only. Data management codes control data movement through the data management unit to prepare and transfer data for the computation. Multiple register files with active file swapping scheme may be used to simplify the computational operations without decreasing performance. The arrangement provides a significant reduction in power and is, therefore, especially advantageous for battery-operated communication applications and devices.

35 Claims, 16 Drawing Sheets

FIG.4b-1

- 102 MicroMarco-Op Select MUX (116)
- 118 Macro-Op Conn. MUX (8X6-TO-1)
- ME Control
- 121 Macro-Op Input Reg's (8) — 104
- Reg Write
- DMA Controller / DMA Source Address Reg's (8)
- Memory — 124a
- Reg Write — 126
- Macro-Op Feedback Path
- 106 Management Entry (ME) — Input Status / Output Status / Control Flags / Counters — 146
- 144 Decoded Macro-Op Instruction Reg's (16)
- Macro-Op Decoder
- 140 Encoded Macro-Op Instruction
- TO FIG. 4b-2

COMPUTATION USING CODES FOR CONTROLLING CONFIGURABLE COMPUTATIONAL CIRCUIT

The present invention relates to a concurrently-filed U.S. patent application Ser. No. 08/988,867, entitled "Reconfigurable Macro-Operation Signal Processing Arrangement And Method".

FIELD OF THE INVENTION

The present invention is directed to an architecture-based computing engine and, more particularly, to a signal processing architectural arrangement and method for wireless communications.

BACKGROUND

Computer arrangements, including microprocessors and digital signal processors, have been designed for a wide range of applications and have been used in virtually every industry. Many of these applications have required battery operation and portability and have, therefore, emphasized minimal levels of power consumption and compactness. This has lead to the development of relatively compact computing-engine designs that operate with minimal levels of power consumption. Some applications have further required a high-speed computing engine that can perform effectively on a real-time or near real-time basis.

For many applications, a particular computing engine is selected as a function of how efficiently the engine can process the type of data anticipated to be served for the application at hand. Optimizing the processing throughput for certain types of applications can contribute significantly to the overall product performance. Thus, for many applications, throughput is the main factor in the selection process, and the other application requirements play a less important role.

For certain types of applications, it is important that the computing engine provide high processing throughput without any significant compromise on power consumption. One such application is mobile wireless communications applications. Mobile communicators are battery operated and involve processing large volumes of data associated with voice communications in real time. For effective communication, compromises must be made on power consumption to assure that the mobile communicator has sufficient processing power to handle the large volumes of voice and channel coding in real time. This is because the processing of the large quantities of such coding can increase power consumption significantly. Computing engines arranged to mitigate power consumption problems often become burdened when encountering such quantities of data. This can severely denigrate the performance of the mobile communicator by decreasing the quality of the communications and by limiting the ability of the computing engine to handle other important tasks concurrently.

SUMMARY

Various aspects and embodiments of the present invention are directed to a micro-computer circuit arrangement for executing instructions. According to one embodiment, the invention is directed to such an arrangement including: a computational circuit; a decoder for processing the instructions into computational codes and data management codes; a computational controller, responsive to the computational codes, for configuring the computational circuit; and a management processing circuit, responsive to the data management codes, for providing computational data to the computational circuit.

According to another embodiment, the present invention is directed to a method for executing instructions in a microcomputer circuit arrangement. The method includes: storing computational data; processing the instructions into computational codes and data management codes; in response to the computational codes, configuring a computational circuit; in response to the data management codes, transferring the computational data to the computational circuit; and in response to the steps of configuring and transferring, computing the computational data using the computational circuit.

The above summary of the present invention is not intended to characterize each disclosed embodiment of the present invention.

BRIEF DESCRIPTION OF THE DRAWINGS

The invention may be more completely understood in consideration of the detailed description of various embodiments of the invention which follows in connection with the accompanying drawings, in which.

Figure 1:
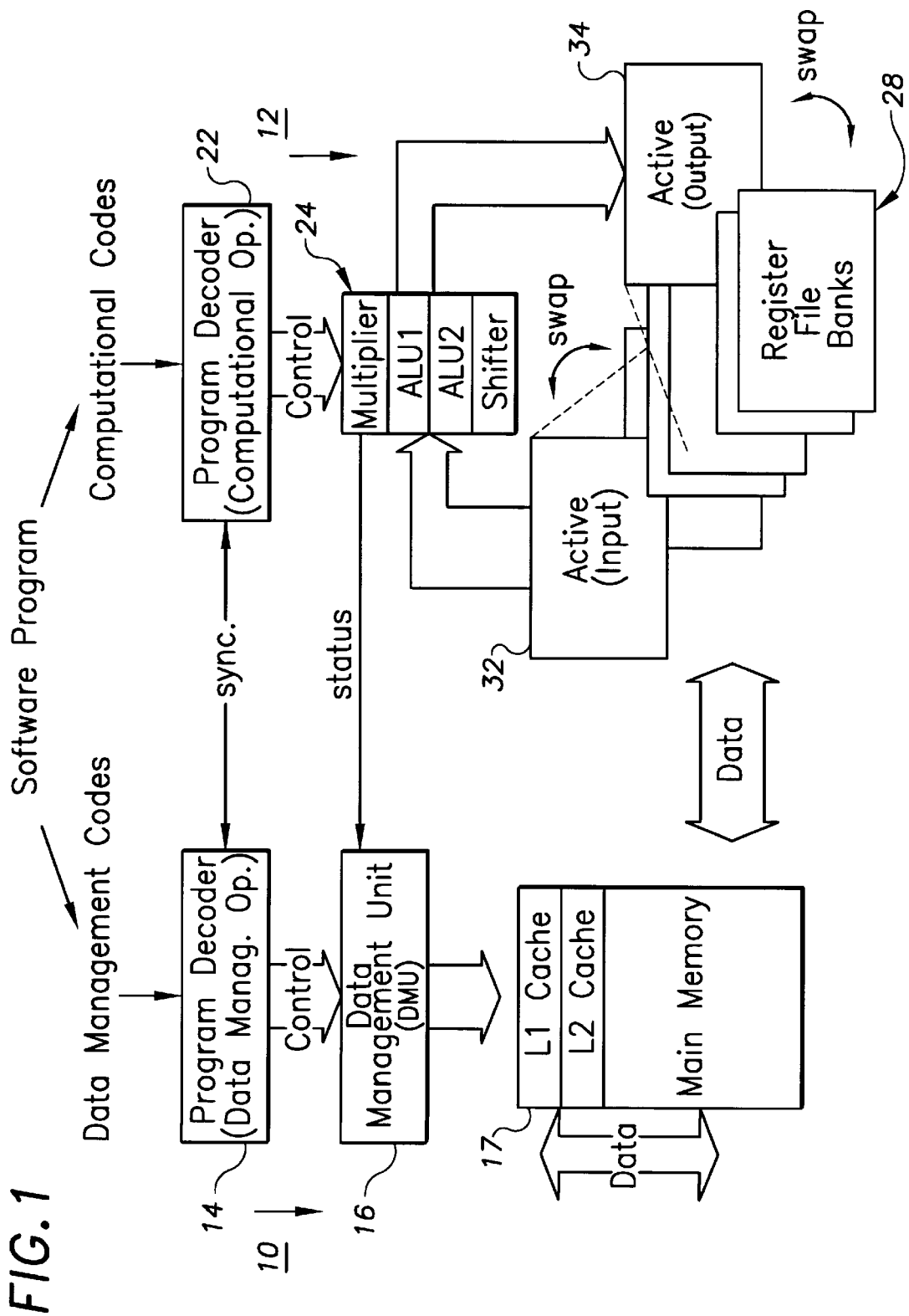
FIG. 1 illustrates a computer architecture, implemented in accordance with the resent invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DISCLOSED EMBODIMENTS

The present invention is believed to be applicable to a variety of systems and arrangements which benefit from low power processing of large amounts of data. The invention has been found to be particularly advantageous in signal processing applications demanding low power consumption for communications. For example, in mobile wireless communications where low power is a major concern, large data flows are processed and transferred from memory to memory. In this specific application context, various embodiments of the present invention reduce power consumption by moving data among different memory spaces efficiently and by taking advantage of the well defined functionality and timing sequences associated with wireless communications protocols. An appreciation of various aspects of the present invention may be obtained through a discussion of application examples operating in such an environment.

Many conventional microcomputers (including microprocessors and digital signal processors) include a computational circuit having functional units such as a multiplier, an arithmetic logic unit (ALU), and a shifter. Each of these units is typically arranged to perform associated mathematical operations for a given set of microcomputer instructions. In accordance with a first architectural embodiment of the present invention, a computational circuit is controlled and operated in response to a decoded computational code. The computational circuit exchanges computational data with a data management unit operating in parallel with the computational circuit. The data management unit is controlled and operated in response to a decoded data management code. The data management and computational codes may be provided by software.

According to another example embodiment of the present invention, data signals are processed for a wireless communications application using the defined functionality and timing sequences of the application's communications protocols. In accordance with this aspect of the present invention, a computer architecture separates program instructions into two parts, computational codes and data management codes. These two parts are coded to provide distinct sets of information for two different program decoders in parallel. Computational codes control a computational circuit, and data management codes control data movement through the data management unit to prepare and transfer communication-related data for the computational circuit. The computation codes can be used to control register-to-register data movement within the computational circuit.

The computational operations can be simplified by using one or more register files, with active file swapping, for transferring computational data to and from the computational circuit. For example, while data in active register files are being processed, other data are prepared and stored into inactive register files by the data management unit. Such data is transferred back to appropriate memory locations after completion of the computational processing as dictated by the configuration and/or the particular architecture being used. In one example embodiment, the respective circuits operating the data management codes are time synchronized, with these operations occurring transparently as perceived by the software programs.

Another aspect of the present invention concerns deterministic memory management, where memory hierarchies are managed based on knowledge of future data beyond a few cycles of prediction. For deterministic applications, such as wireless applications, deterministic memory management, can be controlled by software in lieu of real-time dynamic memory management as typically implemented in a hardware intensive manner. Using an approach of this type, in accordance with the present invention, software programs are used to optimize memory management. This provides for the transfer and reuse of data among different memory hierarchies in a highly efficient manner and with significant reductions in both power consumption and overall processing latency.

Referring now to FIG. 1, a computer architecture is illustrated using an arrangement that takes advantage of the deterministic properties of wireless communications signal processing, where single data streams are processed between voice coding and channel coding within a fixed time slot. The deterministic properties of the related fixed protocols are used to remove the time constraints typically associated with non-deterministic applications, where knowledge of future data is no more than a few cycles of prediction. This arrangement of FIG. 1 includes two circuit paths, a data management path IO for processing the data management part ("data management code") of the instruction and a computation path 12 for processing the computational part ("computation code") of the instruction.

By processing data management information and computational information in this manner, data management circuitry is able to process data as objects while the computational circuitry computes data received at its input ports. Consistent with this aspect of the present invention, the data management path 10 of FIG. 1 includes a data management operation decoder 14 for decoding the data management codes, and a data management unit 16 for accessing different memory hierarchies 16a, 16b and 16c. Relatively independent of the data management path 10, the computation path 12 includes a computational operation decoder 22 for decoding computational codes, a computational unit 24 including different types of computational units (or blocks) for executing selected computations, and register files 28 that are used to transfer data to and from the computational unit 24.

Figure 2:
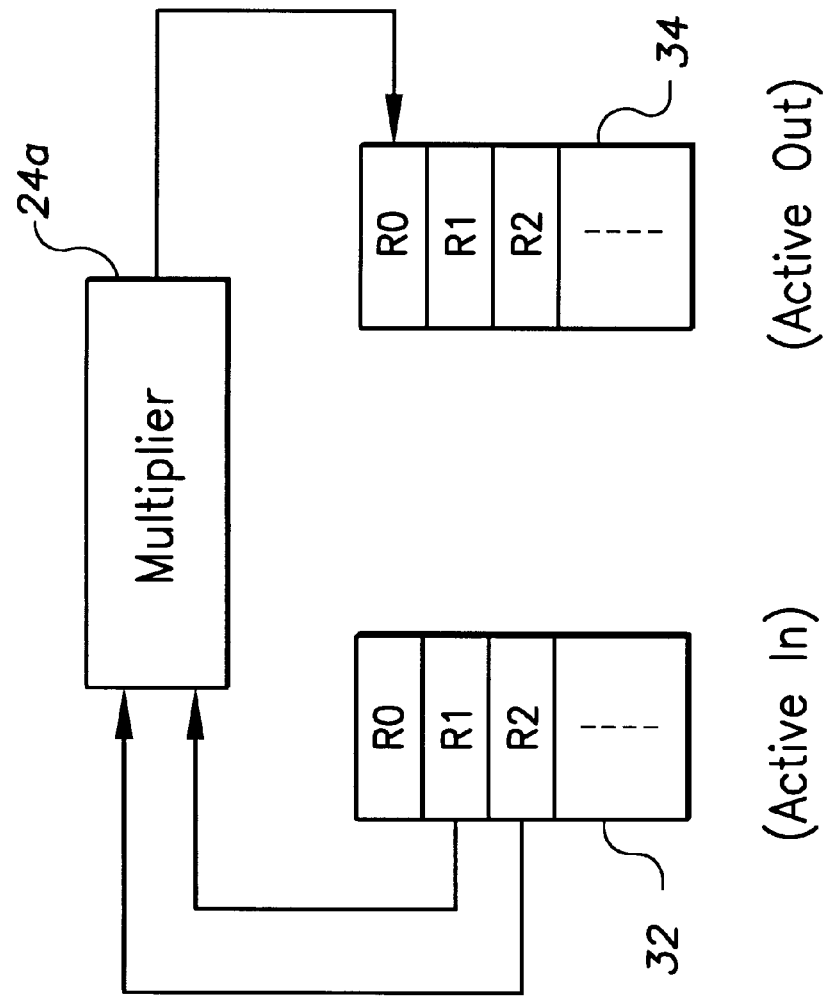
FIG. 2 is an illustration showing a conceptual view of a portion of the computer architecture of FIG. 1, according to the present invention.

According to one specific embodiment of the present invention, instead of using a large register file, multiple small register files are used. A first register file 32 is assigned as the temporary active input file, while the same register file or another register file 34 is assigned as a temporary active output file. The computation path 12 accesses only the assigned active files, although it can access any register file by re-assigning the active file. Consistent with this embodiment, the instruction is arranged assuming that there is only one small register file. All operands are virtually in a same register file, although input sources and output destinations can belong to two different register files. This is illustrated in FIG. 2, where a computational (multiplier) unit 24a receives its input data for computing from the assigned active input register file 32, and outputs resultant data in the assigned active output register file 34.

An important advantage of this approach is that the instruction format for the computational operation flow can be simplified. As illustrated in FIGS. 1 and 2, different sets of data can be stored in different register files. When it is time to execute another set of data, the active register file is "swapped" with another set of data. This can be realized, for example, through reassignment via a multiplexer (not shown) having its inputs coupled to the different sets of data in the register files (28 of FIG. 1) and its output port coupled to present input data for computation.

Figure 3A:
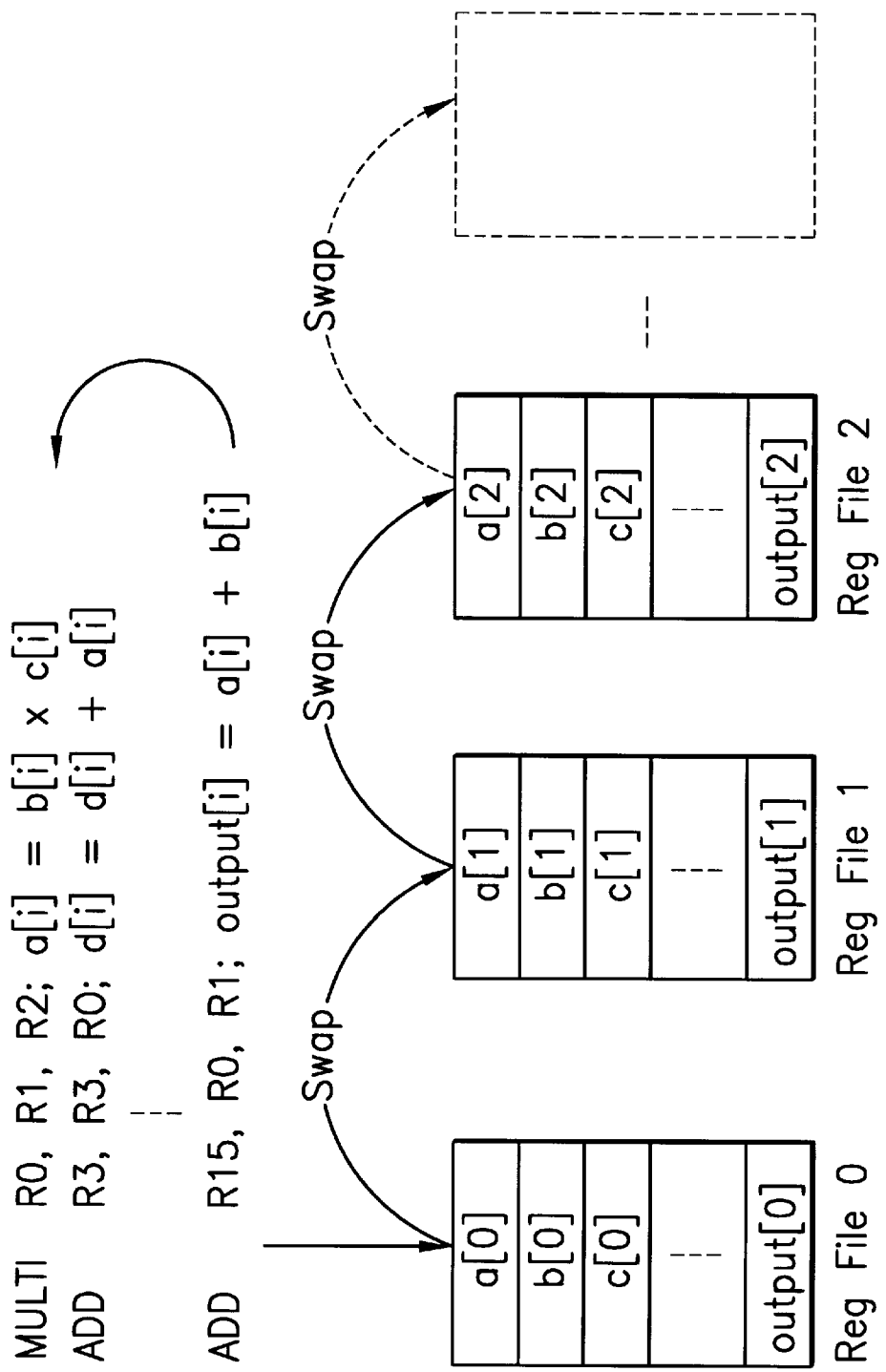
FIG. 3a illustrates an example manner of code reuse by swapping files, according to the present invention, using register files shown in FIG. 1.

FIG. 3a illustrates an example of reusing codes by swapping files, as discussed above. Software, e.g., an assembly language routine or a C-type routine, can be written to process through different sets of data in the various register files through reassignment of the active register file (or files, as the architecture permits). As shown in the upper portion of FIG. 3a, inputs for the computation can be accessed from any of the register files by swapping the active register file with an inactive register file. For operations using data which is matrix-stored as is frequently done in wireless communications, this can be a significant benefit.

Figure 3B:
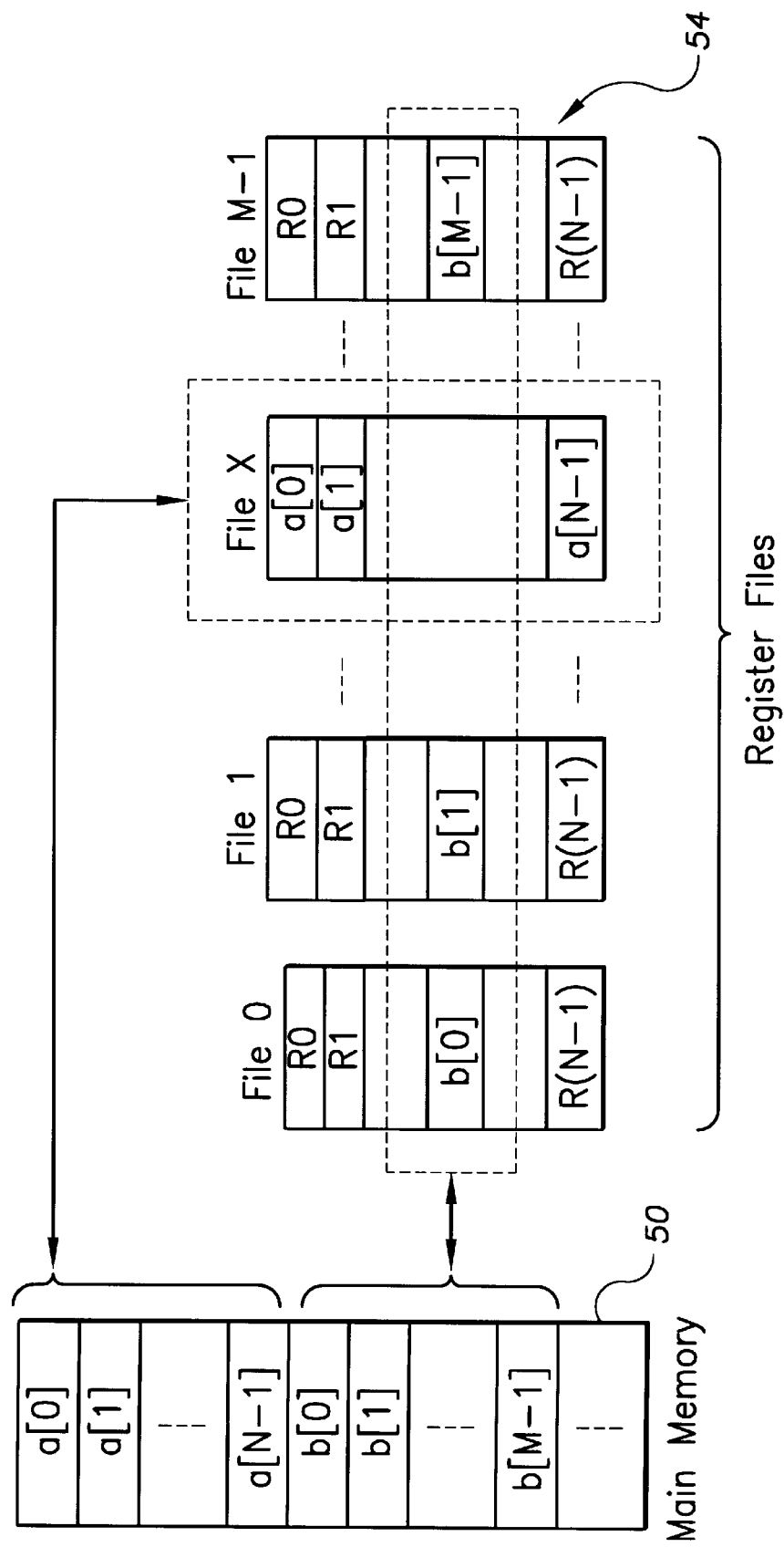
FIG. 3b illustrates an example block data transfer to and from the register files shown in FIG. 1, also according to the present invention.

Data management codes control active register file swapping and data movement through the data management unit. Block transfer among main memory and caches are done through direct memory access (DMA) channels. In addition to single datum transfer, two types of block transfer can be utilized to move data to or from register files. As shown in FIG. 3b, a block transfer can be made for data in a same register file or the same numbered registers across register files. By providing two orthogonal accesses and file swapping control, the flexibility of matrix and vector operations is enhanced. This reduces unnecessary data transfers and increases the instruction code density.

On the other hand, to reduce the complexity, block sizes and locations can be limited. For example, for a transfer on a single register file, the data block can only be a full register file, the lower half of the file, or the upper half of the file. For a transfer on the same numbered registers across register files, the data block can only be in a full row, a front half of the row, or a back half of the row. This limitation has little impact on the overall operation, and it reduces significant amount of overhead on hardware.

Figure 3C:
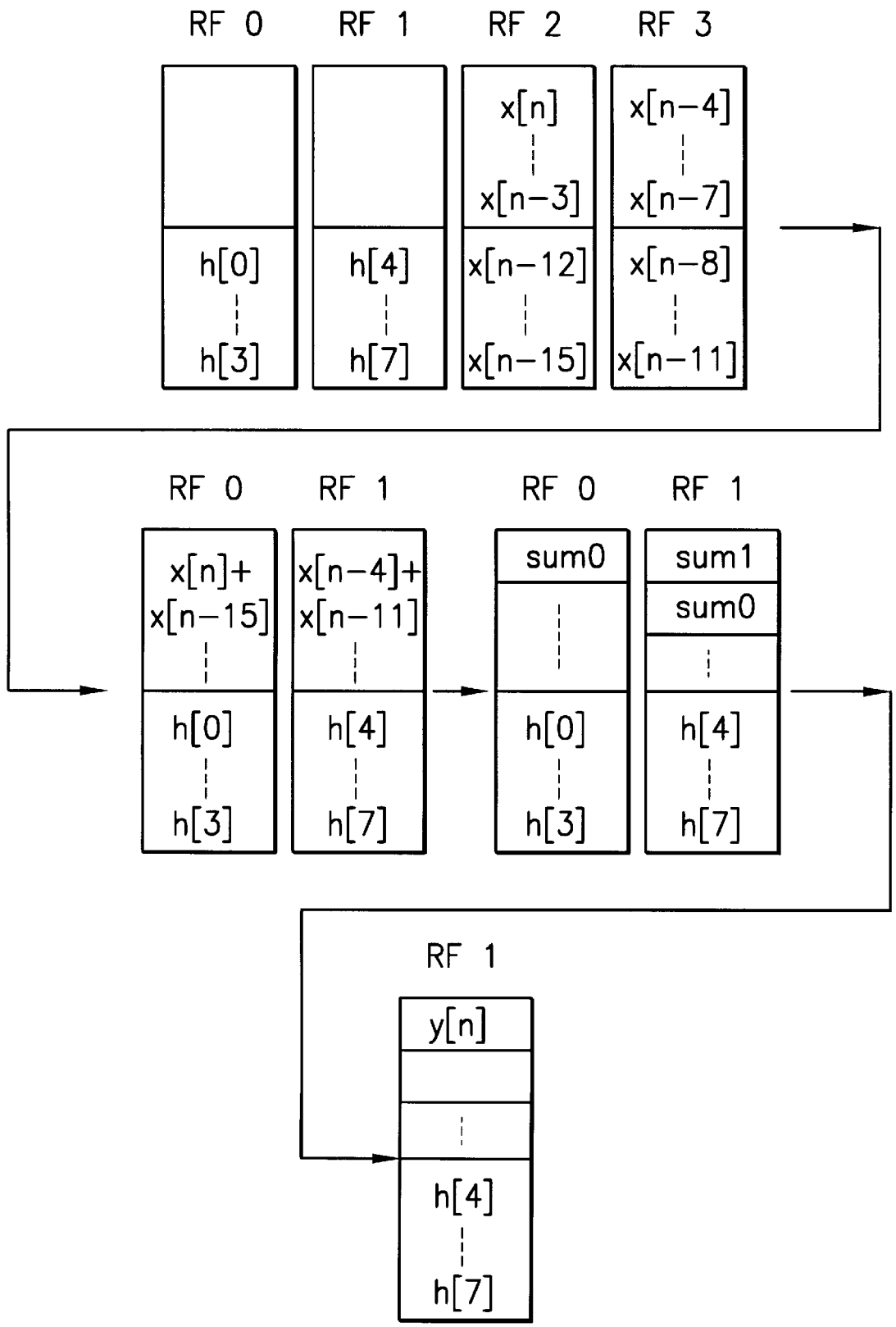
FIG. 3c illustrates an example arrangement of register files for a finite impulse response filter application, according to the present invention.

Symmetric finite impulse response (FIR) filters are widely used in wireless communications and, therefore, can be used to illustrate the operations of the architecture of FIG. 1 for a wireless communications application. In this example, assume a 16-tap symmetric FIR filter having eight register files numbered RF0, RF1, etc., each with eight registers. Equation 1 represents a 16-tap symmetric FIR filter. The pseudo-operations are listed below. FIG. 3c shows the corresponding data in register files as the operations are being executed.

$$\text{Equation 1:} \quad y(n) = \sum_{k=0}^{7} h(k)[x(n-k) + x(n-15+k)]$$

Pseudo-operations:

| | Data Management Op. | Computational Op |
|---|---|---|
| | (move h[0j-h[31 into PF0 - UpperHalf) | |
| | (move h[41-h[7]into PF1-UpperHalf) | |
| 0000 | move x[n]-x[n-31 into PF2__LowerHalf | (operations for y[n-I]) |
| 0001 | move x[n-12]-x[n-15] into RF2__UpperHalf | (operations for y[n-I]) |

-continued

Pseudo-operations:

| | Data Management Op. | Computational Op | |
|---|---|---|---|
| 0002 | assign RF2 as active input file assign RFO as active output file | | |
| 0003 | move x[n-41-x[n-7] into RF3 - LowerHalf | add | RO, RO, R7 |
| 0004 | move xfn-8]-x[n-I 11 into RF3__UpperHalf | add | RI, RI, R6 |
| 0005 | (background housekeeping or idle) | add | R2, R2, R5 |
| 0006 | (background housekeeping or idle) | add | R3, R3, R4 |
| 0007 | assign RF3 as active input file assign RF I as active output file | | |
| 0008 | (data movement into RF2 for y[n+I]) | add | RO, RO, R7 |
| 0009 | (data movement into PF2 for y[n+I]) | add | RI, RI, R6 |
| 000a | (background housekeeping or idle) | add | R2, R2, R5 |
| 000b | (background housekeeping or idle) | add | R3, R3, R4 |
| 000C | assign RFO as active input file assign RFO as active output file | | |
| 000d | (data movement into RF3 for y[n+I]) | multi | RO, RO, R4 |
| 000e | (data movement into RF3 for y[n+I]) | mac | RO, RI, R5 |
| 000f | (background housekeeping or idle) | mac | RO, R2, R6 |
| 0010 | (background housekeeping or idle) | mac | RO, R3, R7 |
| 0011 | assign P-F I as active input file assign RFI as active output file | | |
| 0012 | (background housekeeping or idle) | multi | RO, RO, R4 |
| 0013 | (background housekeeping or idle) | mac | RO, RI, R5 |
| 0014 | move RFO - RO into PF I - RI | mac | RO, R2, R6 |
| 0015 | (background housekeeping or idle) | mac | RO, R3, R7 |
| 0016 | (background housekeeping or idle) | add | RO, RO, RI |
| 0017 | move y[n] into memory | (operation for y[n+1]) | |

As shown on the right side, the computational codes are relatively simple. The same assembly codes also repeat in different places. The same arithmetic operation block processes through different sets of data, while the data management codes on the left side assign the active input and output register files. The computational codes can be reused. Hence, the effective code density is increased. It applies to many routines used for wireless communications. On the data management side, all the commands are simple and straightforward. The required instruction word length is minimal, which minimizes the impact on the overhead introduced by the second instruction stream. On the other hand, there are many open slots available for background housekeeping, and they can be used to arrange future data in lower level memory hierarchies. This is specially useful in the transition period between two tasks.

A more specific example embodiment of the architecture of FIG. 1 includes a fixed-point version with 16-bit word length, eight register files each having eight registers, and software routines (implemented at assembly language and at C language levels) common to many wireless communications. The performance for this embodiment is listed below in Table 1. As shown, an increased number of data movements required in the routine corresponds to a higher performance. The overall improvement of full protocol processing is expected to be higher, because data flows can be optimized globally to reduce the overhead from task switching.

TABLE 1

| Routine Reduction | Power Reduction | Effective Latency |
|---|---|---|
| Symmetric FIR (8x-tap) | 12% | 25% |
| Symmetric FIR (others) | 9% | 21% |
| LMS adaptive FIR (4x-tap) | 17% | 21% |
| Sum of squares | 6% | 7% |
| Maximum vector value | 11% | 19% |

TABLE 1-continued

| Routine Reduction | Power Reduction | Effective Latency |
| --- | --- | --- |
| Discrete Cosine Transform | 13% | 25% |
| Radix-2 FFT (256 points) | 24% | 33% |
| Viterbi decoding (GSM) | 29% | 28% |
| VSELP codebook search | 21% | 37% |

As can be recognized from the above table, this architecture achieves low power and low latency, with only a slight increase in complexity of software programming. Typically, conventional microcomputers use only one instruction stream and commands are issued in sequence and finished step by step. However, not all operations are correlated in such conventional microcomputers. Packing all possible commands in a single dimension reduces the flexibility to optimize power consumption. By introducing another dimension, many housekeeping tasks can be taken away from the primary instruction stream and executed in the background. This simplifies the primary instruction set and reduces the clock rate for the just-in-time processing required in wireless communications. Power supply voltages can, therefore, be reduced to support lower clock speeds. The secondary instruction stream supports the primary instruction stream while necessary and remains idle otherwise. The disclosed architecture reduces power consumption by taking advantage of the intrinsic parallelism and orthogonal properties associated with the data flow of FIG. 1. On the other hand, while the secondary instruction stream is used specifically for data management, all data movements can be globally optimized by software directly. Unnecessary data movements are readily eliminated. Those data used most frequently can be kept in the highest memory hierarchy, instead of being flushed away by temporary but less frequently used data.

Data loading and storing contribute to a large portion of process latency. Direct control on data movement helps to solve this problem. Independent data management in the background reduces the overall processing latency from preprocessed data to post-processed data.

The background data management increases the complexity of software programming. All data movements are not only transparent to software, but also need to be controlled by software. Each processing routine needs a counterpart for data management. However, wireless communications software for protocol processing is programmed only once and embedded into read-only-memory. It is seldom modified unless the protocol changes. For mobile wireless communications, the importance of lower power consumption surpasses the extra burden on software programming. A tradeoff in this regard, therefore, can be tolerated.

Figures 1, 4A:
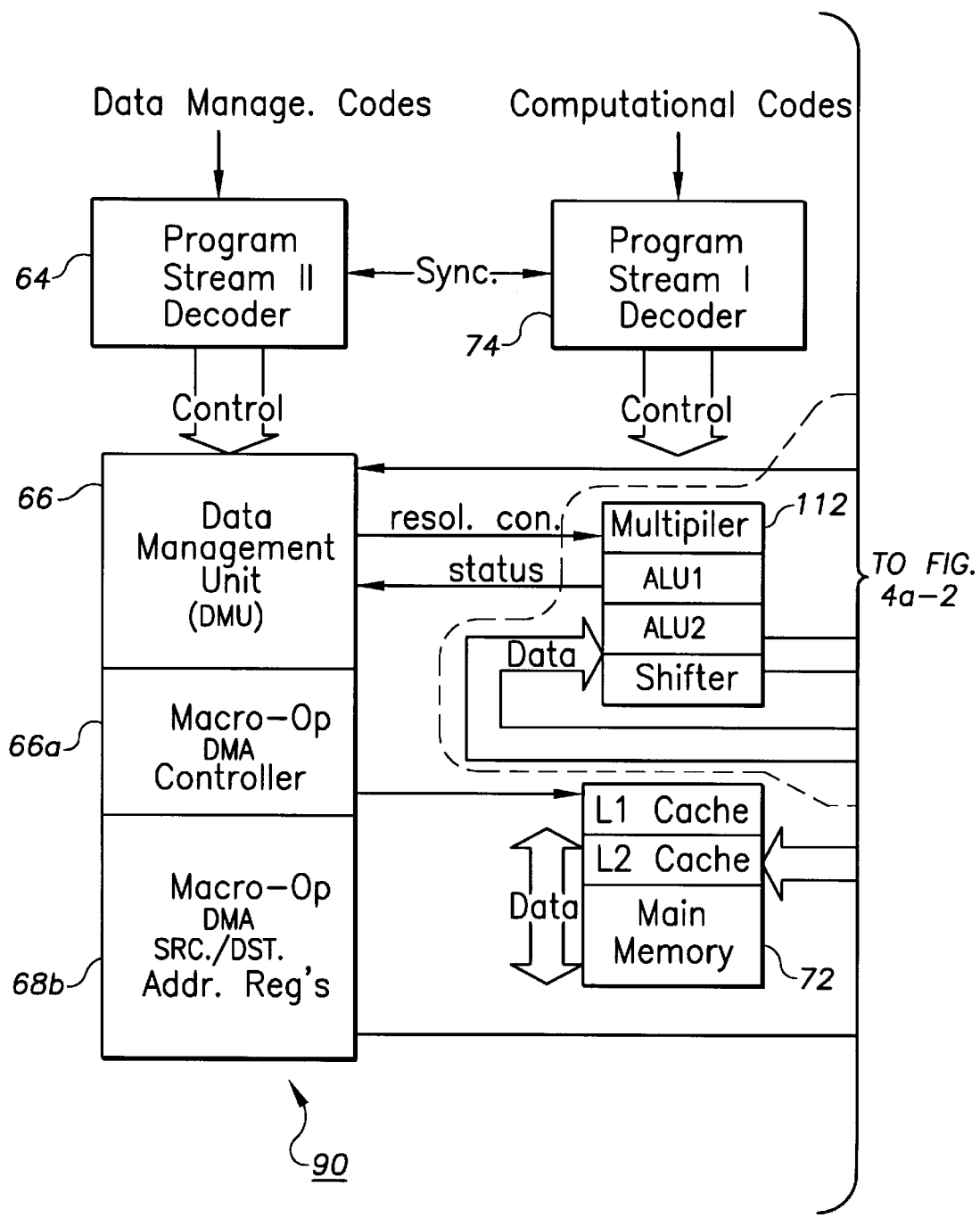
FIG. 4a illustrates an example architecture of an expanded arrangement of a computer architecture, according to the present invention, including circuitry arranged consistent with each of the above figures.
Figures 2, 4A:
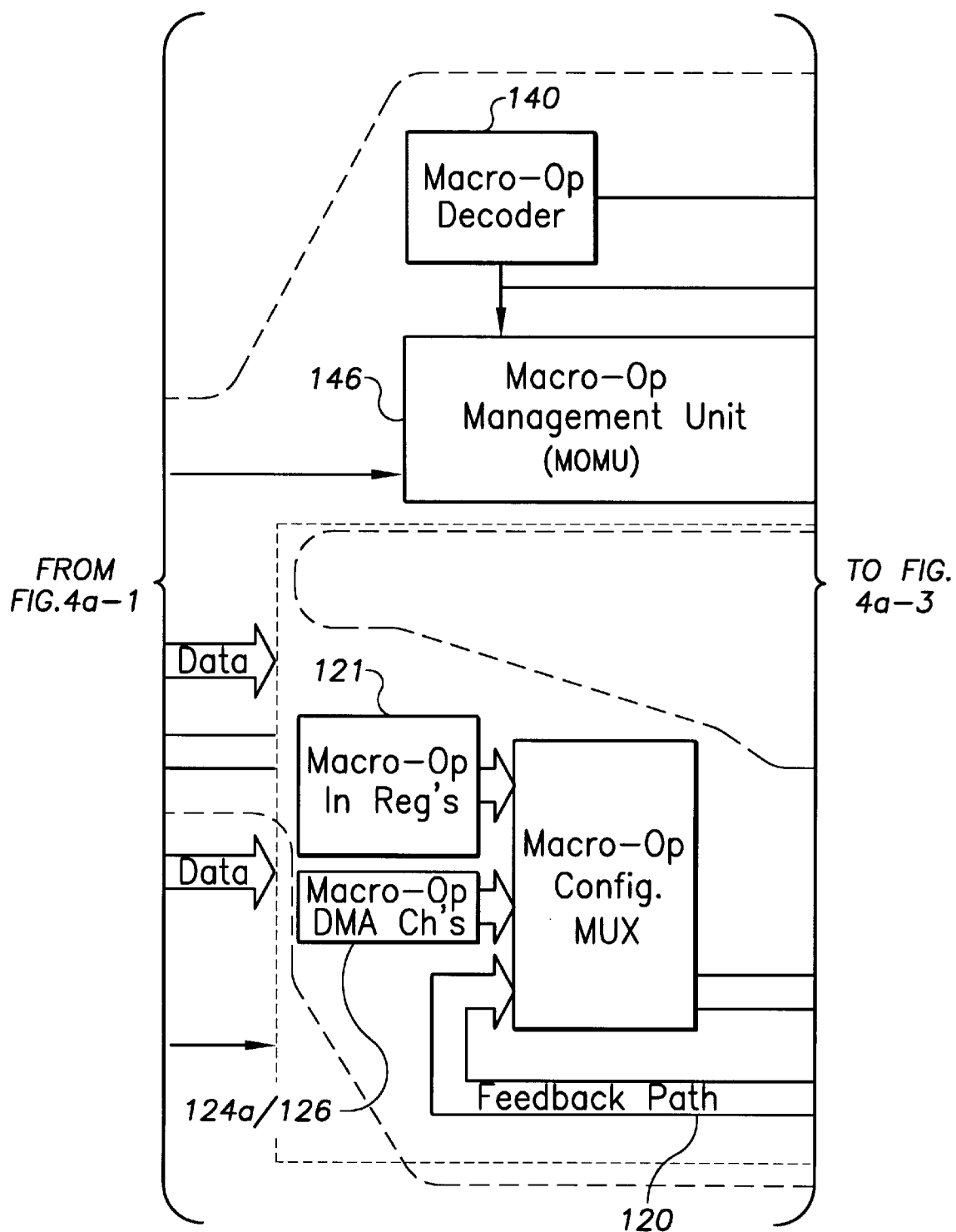
Figures 3, 4A:
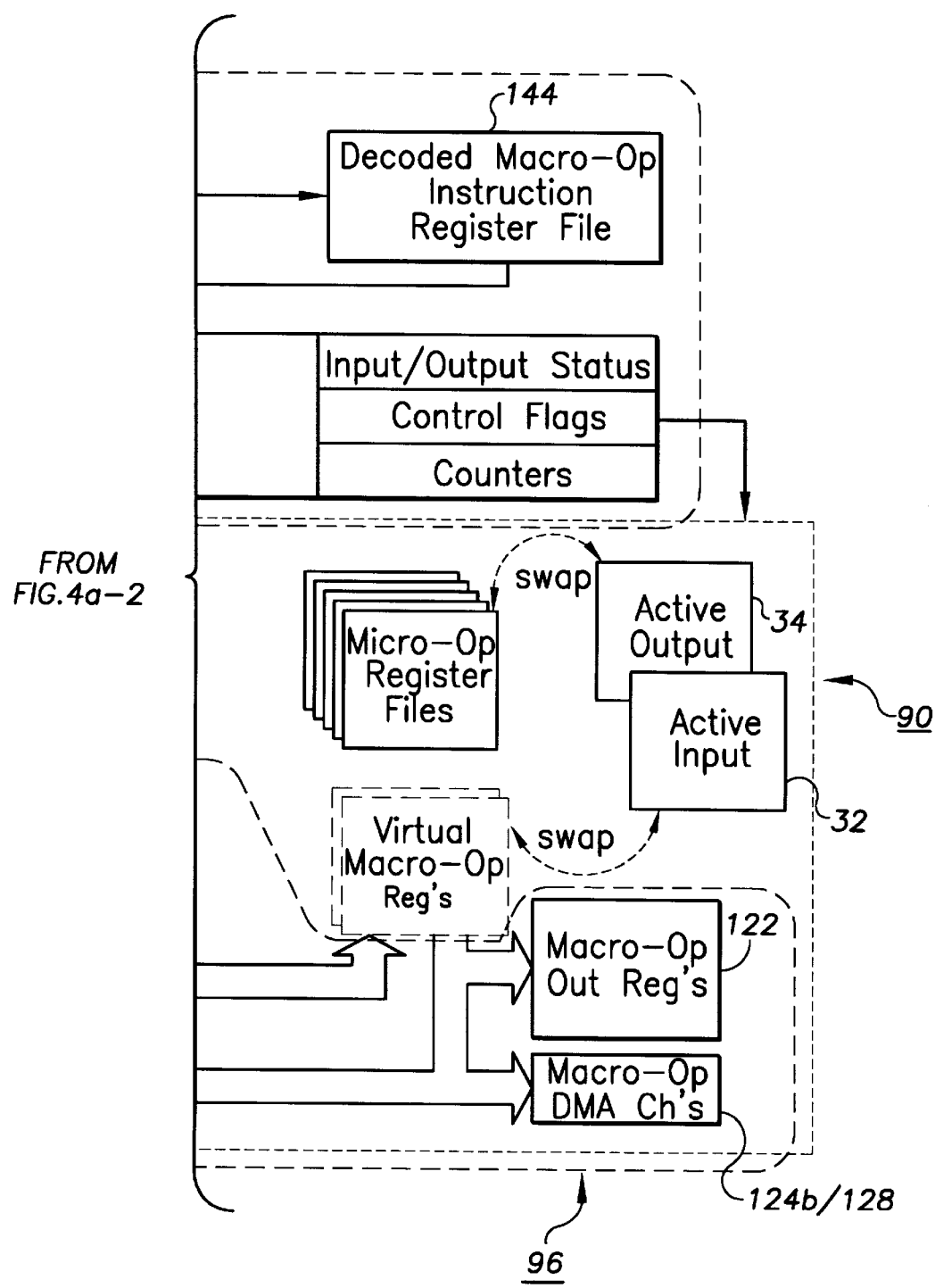

FIG. 4a illustrates an expanded example architecture including the embodiment of FIG. 1. The example architecture of FIG. 4b operates in conjunction with a main processing unit (not illustrated) and can be viewed as including a first computer architecture section 90 and a second computer architecture section 96. The first computer architecture section 90 includes circuits corresponding to those shown in FIG. 1. The computer architecture section 90 also includes a DMA unit 66 having control 66a for macro-operation instructions used to transfer data with DMA circuits in the second computer architecture section 96 through memory 90, and control 66b for macro-operation instructions used to transfer data directly with corresponding circuits in the second computer architecture section 96. The second computer architecture section 96 includes circuits corresponding to those shown in FIG. 4b, and is discussed in connection with FIG. 4b.

Figures 2, 4B:
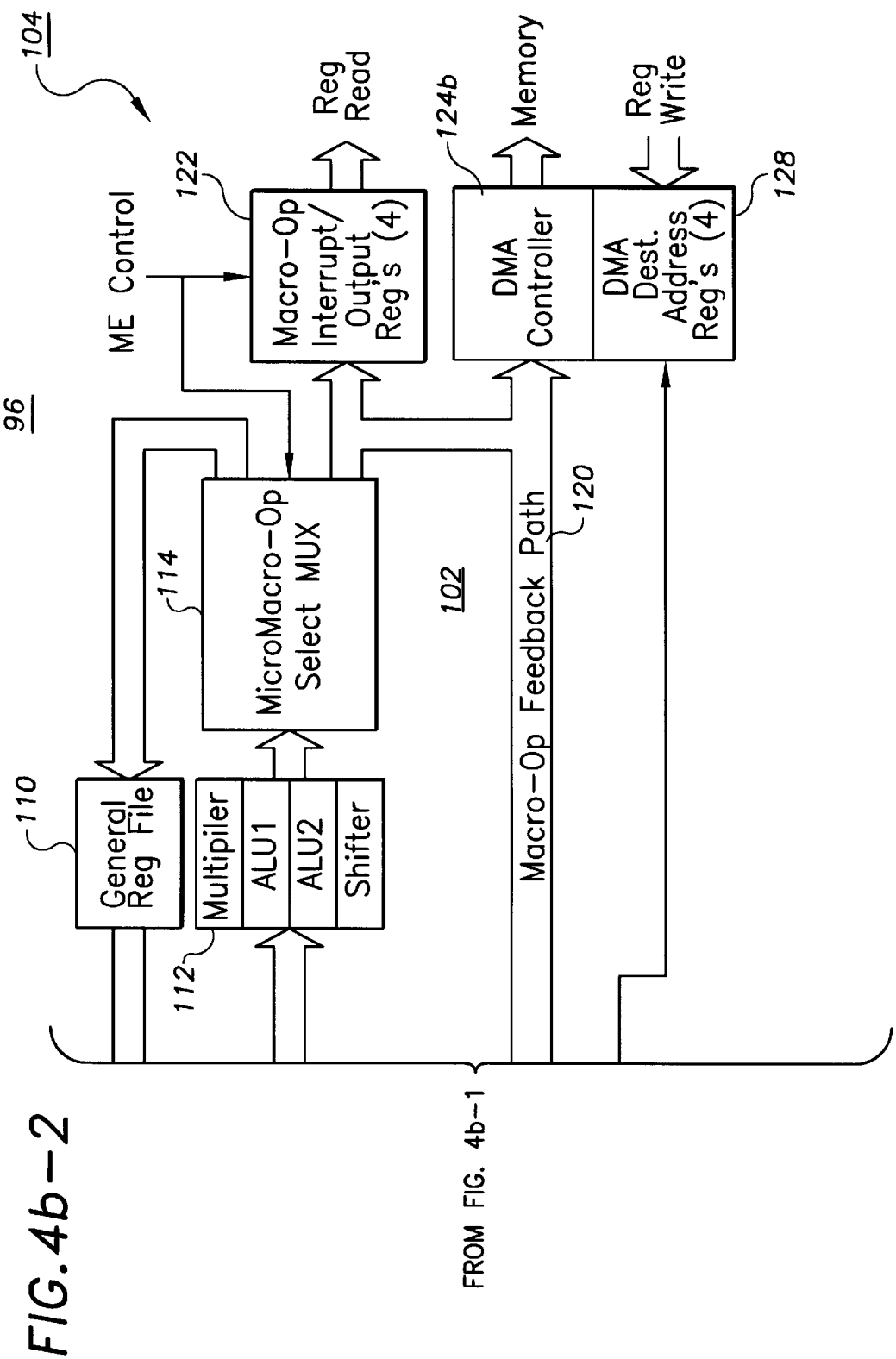
FIG. 4b represents one particular aspect of the computer architecture of FIG. 4a, in accordance with the present invention.

FIG. 4b illustrates the computer architecture section 96 of FIG. 4a involving execution of macro-operation instructions and configuration for computation. The example architecture of FIG. 4b can be viewed as including three types of circuits: macro-operation multiplexer circuitry 102; input/output circuitry 104; and management circuitry 106. These circuits are responsive to encoded macro-operation instructions and input data stored in various registers and memory, and can be used to provide various modes of operations, including loop (or repetitive) instruction modes and discrete instruction modes.

The macro-operation multiplexer circuitry 102 of FIG. 4b includes a general register file 110, a computational unit 112, an output select multiplexer 114, an input select multiplexer 116, a macro-operation multiplexer 118, and associated interconnecting data paths. The general register file 110 is conventionally arranged to temporarily store data for micro-operations, as computed in connection with the computation unit 112. In this example embodiment, the general register file is used only at the micro-operation level and is not used to multiplex, decode or otherwise assist with macro-operation executions. The output and input select multiplexers 114, 116 are implemented to direct data to appropriate paths for micro-operations or macro-operations, as needed. For example, the output multiplexer 114 generates results computed by the computational unit 112 to the general register file 110 where combinations of micro-instructions involve feedback processing as discussed in connection with the examples above. The output select multiplexer 114 directs results that are completely computed according to the macro-operations to the I/O circuitry 104 or, along a macro-operation feedback path 120, to the macro-operation multiplexer 118.

The macro-operation multiplexer 118 determines the configurations of the macro-operation datapath in response to the management circuitry 106. The multiplexer 118 therefore determines routing of data from the I/O circuitry 104 and from the feedback path through the general register file 110. Such selected data is then processed through the input select multiplexer 116, in response to the configuration control provided by the multiplexer 118 for computation by the computational unit 112. Viewing the functions of the input select multiplexer 116 and the macro-operation multiplexer 118 as a single unit, this configuration and selection control is implemented in a variety of ways, according to the targeted applications. For instance, the multiplexing can permit data from only certain registers and/or memory, as provided by the I/O circuitry 104, for selectable or non-selectable routing to one or more inputs of the computational unit 112.

The ME control signal, as shown at various locations in FIG. 4b, is provided by the management circuitry 106 to coordinate activities and timing in response to the executing macro-operation instructions.

The I/O circuitry 104, in this specific example implementation, includes a set of macro-operation input registers 121, a set of macro-operation interrupt/output registers 122, a channel DMA controller 124, and DMA source and destination address registers 126 and 128. The input registers 120, eight registers in this specific example, can be used as general registers for storing micro-operation data. Data so stored in the input registers 120 is not read back to the processing unit executing the write operation. Rather, this data is temporarily stored to provide constant parameters used for implementing a macro-operation. This stored data is not changed while macro-operations are executed in "loop-mode" as addressed subsequently in connection with FIG. 5a.

The macro-operation output/interrupt registers 122 are implemented to support temporary data storage for reading only. The data is written into the interrupt/output registers 122 by the output selector multiplexer 114, for example, in response to a completed computation. Data stored in the interrupt/output registers 122 can be read by the main (external) processing unit for the macro-operations, which are executed in "discrete mode" in response to an interrupt, for example, as may be provided by an interrupt control signal from the management circuitry 106. The interrupt output registers 122 are used to store immediate results from the computational unit 112 to avoid any data loss. After the interrupt is cleared, the external processing unit restores the intermediate results in the processing path 120 via the input registers 121 to complete execution of the macro-operation or macro-operations.

The DMA controller 124, as shown in FIG. 4b, includes an eight channel memory loading DMA controller 124a, and a four channel memory storing DMA controller 124b. The loading DMA controller 124a includes eight DMA input channels to provide needed input data from memory. In response to control messages from the management circuitry 106, the loading DMA controller 124a activates the appropriate input channels at the appropriate times. The memory locations to provide the data are identified by the values in the DMA source address registers and DMA offsets, which are increased or decreased by one for each DMA access. The DMA controller 124a and its input channels are simplified implementations of a conventional DMA structure, with memory loading being provided by an external processing unit.

The storing DMA controller 124b, as shown in this example, is implemented using four DMA output channels to provide needed data to external memory. These DMA output channels are implemented substantially identical to the DMA input channels discussed in connection with the loading DMA controller 124a, except they are implemented in an opposite direction for outputting memory to data rather than loading data from memory.

As will be discussed in a specific example implementation in connection with FIG. 4c, the loading DMA controller 124a and the macro-operation input registers 120 can be selectively accessed by the multiplexer 118 to provide input parameters to the computational unit 112.

The DMA source address registers 126 include a total of eight registers in this particular example implementation. These eight registers provide memory buffer addresses to the loading DMA controller 124a. As with the macro-operation input registers 120, these DMA source address registers 126 are write only. Each address register provides a source address to the corresponding input channel.

The DMA destination address registers 128 operate in a manner similar to the DMA source address source registers 126. Each of the destination address registers, four in this example implementation, provides a destination address to the corresponding DMA output channel within the storing DMA controller 124b.

The management circuitry 106 includes a macro-operations instruction decoder 140, a decoded macro-operation instruction register file 144, and a management entity (ME) unit 146, including associated control registers and counters. The ME unit provides the control intelligence for the macro-operation approach, as described above. The ME unit 146 includes input and output status registers, control flags and counters. The ME unit records the status of macro-operation executions and generates corresponding control signals to each of the units under the control of the ME unit 146 to provide unified coordination and timing to the computer architecture of FIG. 1.

The macro-operation instruction decoder 140 receives an encoded macro-operations instruction from an external processing unit. The macro-operation 140 provides the decoded instruction to the ME unit 146, and provides a readily decodable control signal (obtained from the encoded macro-operation instruction) to the decoded macro-operation instruction registers 144. In response to a subsequent macro-operation instruction having the same decoded control signal as stored in the instructions registers 144, the management circuitry 106 uses these stored decoded control signals to alleviate the need for complete decoding of the macro-operation instruction.

Figure 4C:
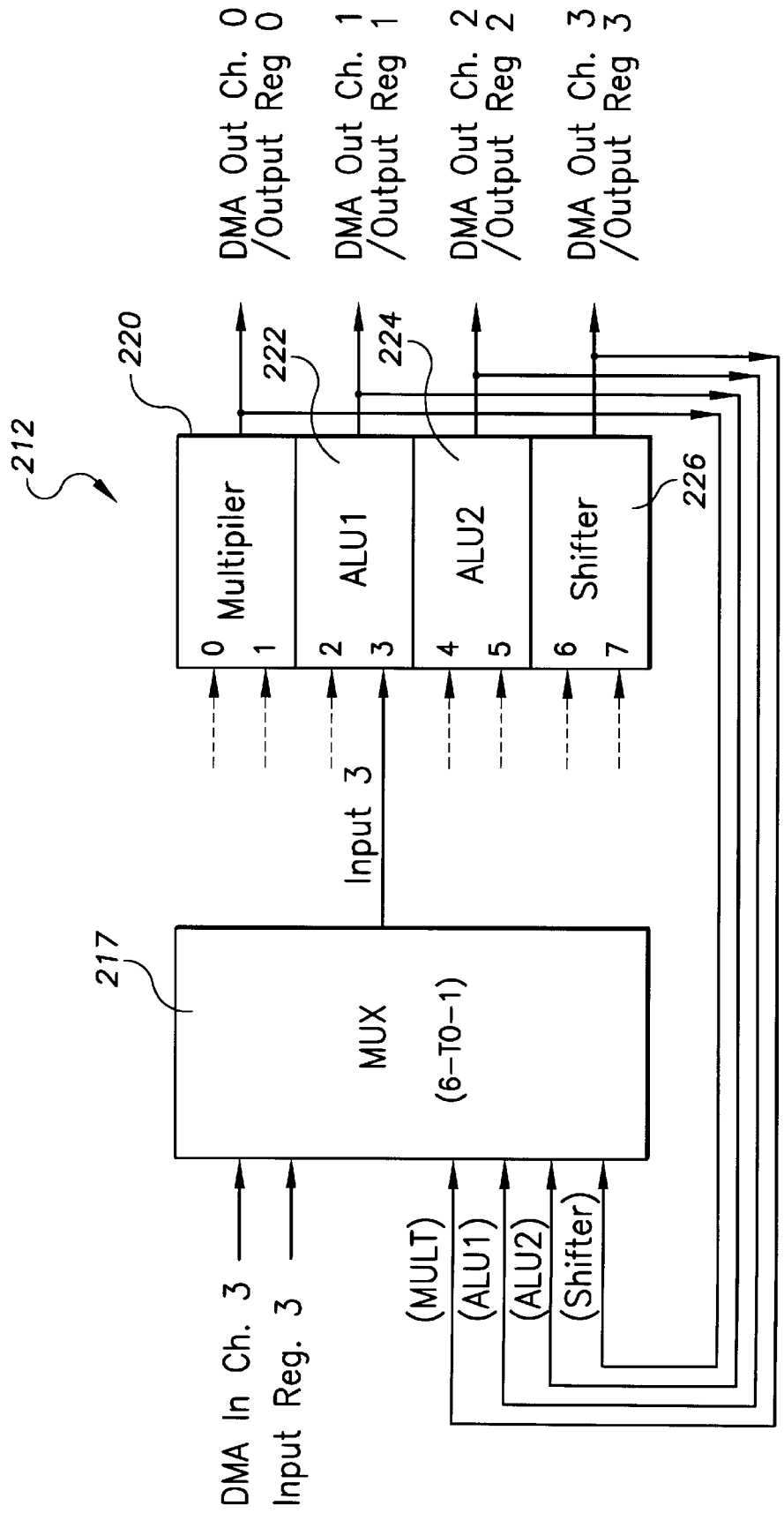
FIG. 4c illustrates a conceptual view of a portion of the computer architecture of FIG. 4b, also according to the present invention.

Referring now to FIG. 4c, a particular implementation of the macro-operation multiplexer circuitry 102 is shown conceptually. In this particular implementation, a multiplexer 217 is used to route various data types to selected inputs of a computational unit 212. Consistent with the general operation of the multiplexers 116 and 118 of FIG. 1, the multiplexer 217 provides the configuration, the multiplexer 217 selects the data to be provided to the eight inputs to the computational unit 212. In this specifically-illustrated example, the computational unit 212 includes three computing circuit types, a multiplier 220, first and second ALUs 222 and 224, and a shifter 226. Each of these four computing circuits has two inputs. The multiplexer 217 selectively routes four of its six inputs to the inputs of the ALUs 222 and 224 and of the shifter 226. Routing of the remaining two inputs to the multiplexer 217 is fixed rather than selective. These remaining two inputs are directly coupled to the two inputs of the multiplexer 220. As indicated in FIG. 4c, this example embodiment includes the first two inputs to the multiplexer 217 as being provided by the third input channel of the loading DMA controller 124a and the third input register of the macro-operation input registers 121, respectively, of FIG. 4b. The lower four inputs to the multiplexer 217 are provided from the feedback path, for example, feedback path 120 of FIG. 4b.

Using a multiplexing arrangement as described in connection with FIG. 4c, involving both fixed and selective data routing, DMA channels coupled to the multiplexer 217 are not completely interchangeable as viewed from an external processing unit loading the main controller 124a, as shown in FIG. 4b for example. The same logic applies to the input register coupled to the multiplexer 217. While this selective/fixed multiplexing approach may be burdensome for some applications, it significantly reduces the complexity of connecting the various multiplexers, DMA controlled units and macro-operation registers used in the overall implementation.

Figure 4D:
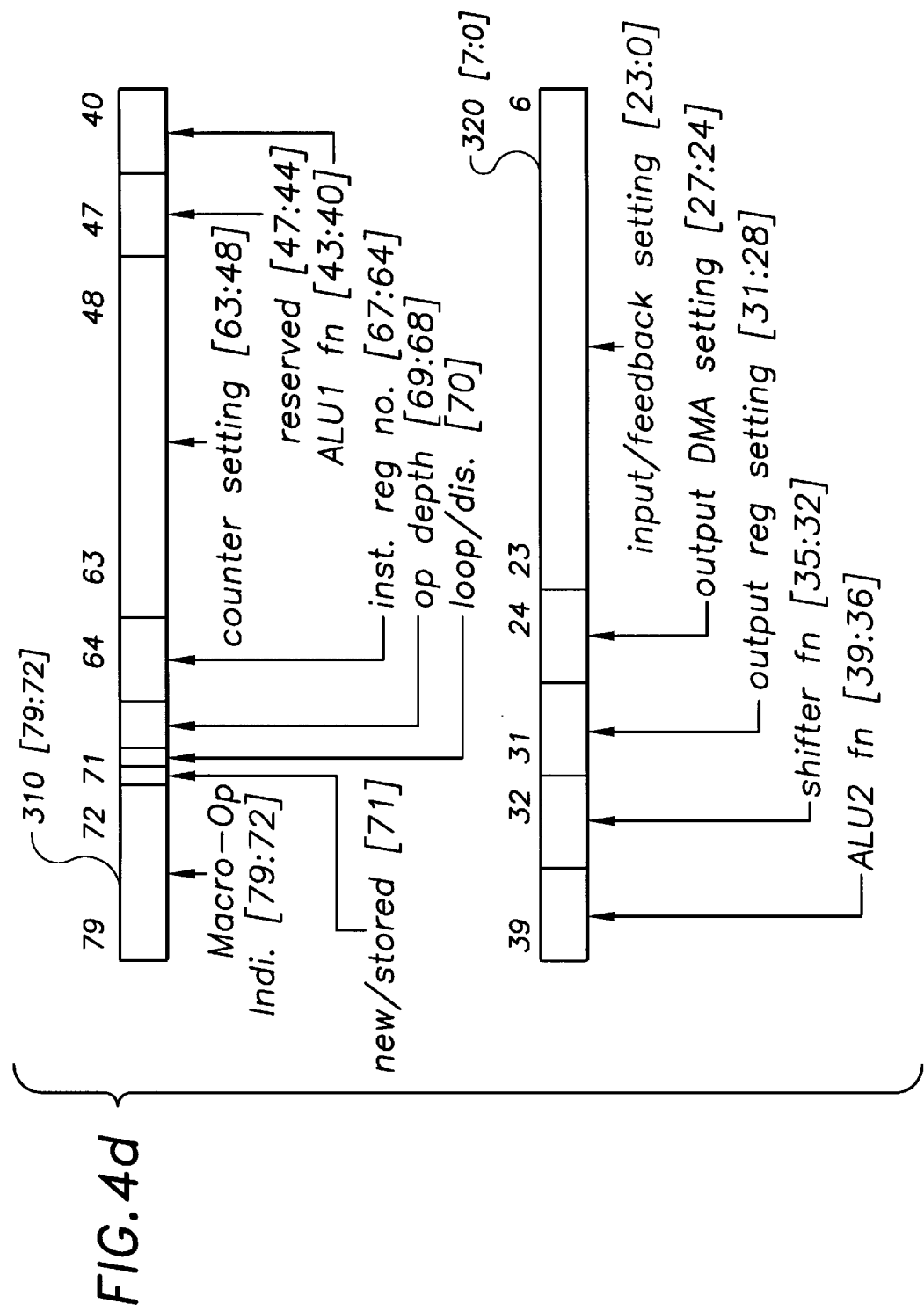
FIG. 4d illustrates a particular embodiment of a macro-operation instruction format, implemented in accordance with the present invention, which may be stored and sent to a computer architecture, such as the one shown in FIG. 4b.

FIG. 4d shows an example macro-operation instruction format that can be used with the architecture of FIG. 1. Assuming eight bits per byte in this instance, this format is ten bytes long (beginning at byte 310 and ending at byte 320). The first byte [79:72] encodes a macro-operation, and is not passed to the macro-operation instruction decoder 140. All information needed for a macro-operation is provided in the remaining nine bytes [71:0]. The lower six bytes are ignored if a stored macro-operation is used. The bit fields and their functionality are explained below.

A macro-operation indication is provided in bits [79:72]. These bits are used as an indication to the program decoder, informing that the issued instruction is a macro-operation. The macro-operation indication is not passed to the macro-operation instruction decoder.

At bit [71], a new/stored instruction Flag 1 informs the ME unit whether the macro-operation instruction is a new type of macro-operation instruction or the same type as stored in one of the macro-operation instruction registers.

At bit [70], a discrete/loop mode Flag 2 informs the ME unit whether to implement the macro-operation instruction using discrete mode or loop mode.

The next two bits [69:68] indicate the operation depth; in other words, how many stages are required to fully implement the macro-operation instruction. Depending on the configuration, each macro-operation can take from one to four micro-operation execution cycles.

The next four bits [67:64] provide an instruction register number. This number identifies which stored instruction to use, while Flag 1 indicates using a stored type of macro-operation instruction. Or, if Flag 1 indicates a new type of macro-operation, this field tells which instruction register should be updated by the new issued macro-operation instruction.

The next field, provided by bits [63:48], is used to set the counter to the execution count needed for repeated execution of the macro-instruction in the loop mode.

The next field [47:44] is an unused field.

An ALU 1 function is provided by bits [43:40]. This field sets the function of the first ALU. This field is ignored if a stored macro-operation is used.

An ALU 2 function is provided by bits [39:36]. This field sets the function of the second ALU. This field is ignored if a stored macro-operation is used.

A shifter function is provided by bits [35:32]. This field sets the function of the shifter. This field is ignored if a stored macro-operation is used.

An output register setting is provided by bits [31:28]. In discrete mode, this field sets which macro-operation output registers should be enabled at the end of execution. In loop mode, this field sets which macro-operation output registers should be enabled at the end of the whole loop. This field is ignored if a stored macro-operation is used.

The next field is an output DMA setting provided by bits [27:24]. This field sets which DMA output channels should be enabled at the end of each execution. This field is ignored if a stored macro-operation is used.

The next field is an input/feedback setting provided by bits [23:0]. This field sets the configuration of the macro-operation connection multiplexer. Therefore, this field decides which inputs should be used and how intermediate results are fed back. There are eight independent settings. Each of them sets the choice of each computational unit input. If the DMA input channel is used, this field also indicates to the DMA whether to increase or decrease the memory address offset by one per DMA access. If this field is not used, one of the corresponding computational units can also be disabled. This field is ignored if a stored macro-operation is used.

As discussed previously, operational flow of the architecture of FIG. 1 includes loop modes and discrete modes. Using new and previously stored instructions for the loop and discrete modes, this includes four modes of operations: new-instruction loop, stored-instruction loop, new-instruction discrete, and stored-instruction discrete modes. They are indicated by the two flag bits: a new-instruction loop mode flag and a stored-instruction loop mode.

The new-instruction loop mode involves several different aspects of control, largely surrounding the macro-operation multiplexer circuitry (102 of FIG. 4b). The various bits involved with this control are as follows: (Step 1) bits [43:32] are decoded to set up the functionality of the ALU and the shifter; (Step 2) bits [31:24] are decoded to set up the output schemes; (Step 3) bits [23:0] are decoded to set up the input and feedback scheme; (Step 4) all decoded information from bits [43:0] is stored into an instruction register numbered by bits [67:64]; (Step 5) the counter is set by bits [63:48]; (Step 6) the input data is retrieved from input registers or DMA channels, where memory locations are based on the pre-loaded DMA source address registers and DMA offsets; (Step 7) the operation is executed and the counter value is decreased by one; (Step 8) the output data is stored to the output registers or the DMA channels, as indicated by the information in bits [31:24], where memory locations are based on the pre-loaded DMA destination address registers and DMA offsets. The above steps of executing and storing are repeated until the counter value reaches zero.

An illustration of this application is provided in software form as follows:

```
mov macro_source_addr_reg_1,buffer_1_addr    {set up}
mov macro_dest_addr_reg_2,buffer_2_addr      {set up}
mov macro_in_reg_2,parameter_1               {set up}
          |
          |
macro [new][loop][N times][....][....][....]  {repeat M times}
```

The stored-instruction loop mode also involves several different aspects of control in connection with the macro-operation multiplexer circuitry. For this mode of operation, bits [47:0] are ignored. The various bits involved with this control are as follows: information stored in the instruction register, as numbered by bits [67:64], is transferred to all corresponding units, such as those in the circuit 102 and 104 of FIG. 1. Next, the set of Steps 5–8 for the new-instruction loop mode, from setting the counter through executing and storing, is repeated until the counter value reaches zero.

An illustration of this application is provided in software form as follows:

```
mov macro_source_addr_reg_1,buffer_3_addr    {set up}
mov macro_dest_addr_reg_2,buffer_4_addr      {set up}
mov macro_in_reg_2,parameter_4               {set up}
          |
          |
macro [stored][loop][M times][inst reg 1]    {repeat M times}
```

The new-instruction discrete mode involves: executing the same steps 1 through 4 of new-instruction loop mode; determining whether the ME control flag "new discrete execution", is present (if zero, the counter is set to zero by bits [63:48] and the flag is set to one; if one, the counter is not set); the set of steps 6 through 8 of the new-instruction loop mode is executed; if the counter value reaches zero, the ME control flag "counter zero" is set to one and the "new discrete execution" is set to zero.

An illustration of this application is provided in software form as follows:

```
         micro-op
         mov    macro_source_addr_reg_1,buffer_1_addr    {set up}
         mov    macro_dest_addr_reg_2,buffer_2_addr      {set up}
         mov    macro_in_reg_2,parameter_1               {set up}
                │
                │
         macro [new][discrete][counter=1][...][...][...]
           move general_reg_1,macro_out_reg_3
         micro-op
```

The stored-instruction discrete mode involves ignoring bits [47:0], transferring the information stored in the instruction register, as numbered by bits [67:64], to all corresponding units, as with the stored-instruction loop mode. Next, the ME control flag "new discrete execution" is checked. If this flag is set to zero, the counter at bits [63:48] is set, along with the flag, to one. If this flag is a one, counter is not set. Next, the set of steps 6 through 8 of the new-instruction loop mode is executed. If the counter value reaches zero, the ME control flag, "counter zero", is set to one, and the "new discrete execution" flag is set to zero.

An illustration of this application is provided in software form as follows:

```
         micro-op
         mov    macro_source_addr_reg_1,buffer_3_addr    {set up}
         mov    macro_dest_addr_reg_2,buffer_4_addr      {set up}
         mov    macro_in_reg_2,parameter_3               {set up}
                │
                │
                │
loop     micro-op
         micro-op
                │
                │
                │
                macro [stored][discrete][inst reg][counter=M]
         mov    general_reg_1,macro_out_reg_3
         micro-op
         │
         │
                jz_macro_counter_flag   end loop         {after M times}
```

EXAMPLE OPERATIONS

Two examples are provided below to illustrate two different operation modes.

a. Symmetric FIR Filter/Loop Macro-Operation $$\text{Equation 1: } y(n) = \sum_{k=0}^{\frac{n}{2}-1} h(k)[x(n-k) + x(n-N+1+k)]$$

Figure 5A:
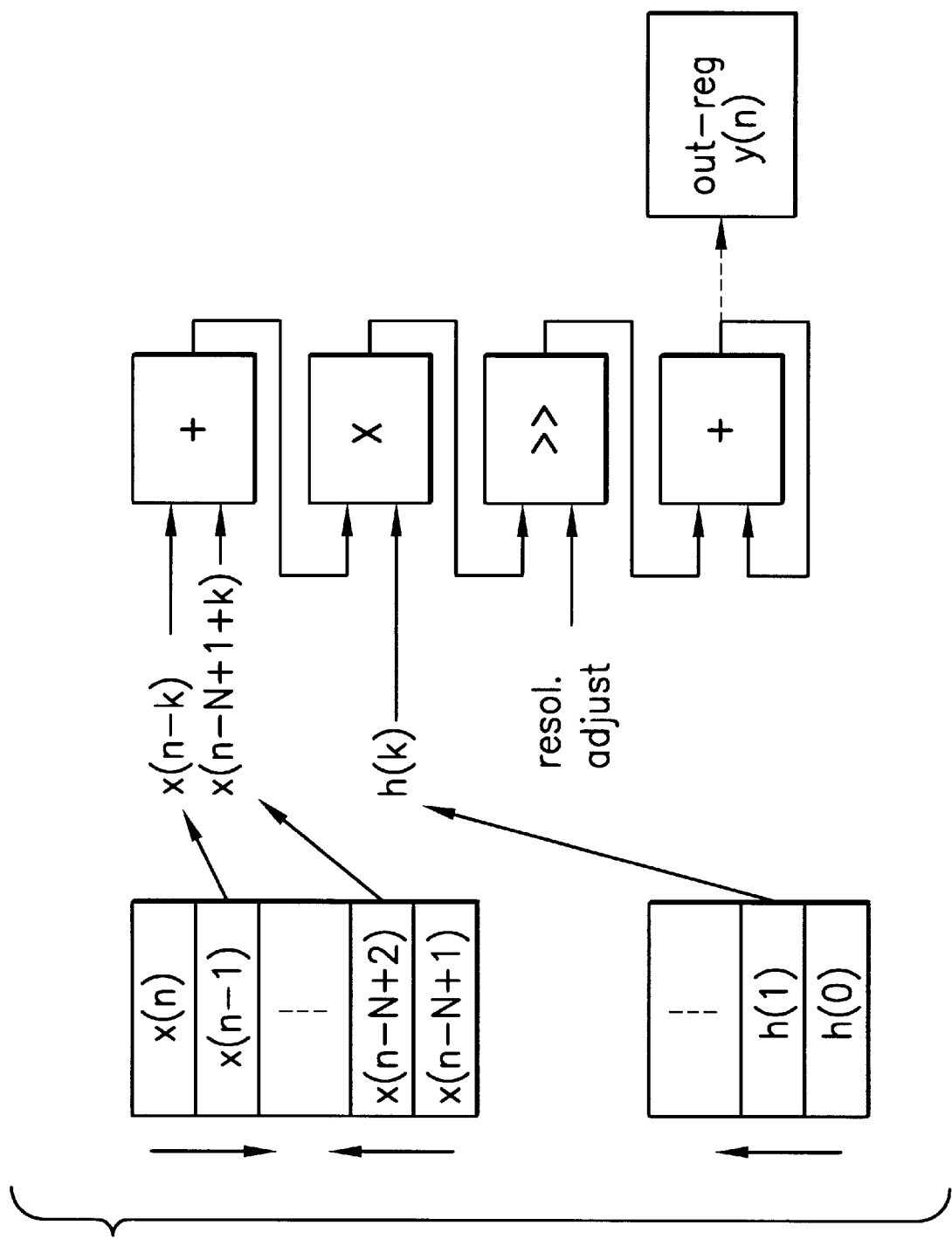
FIG. 5a illustrates a hardware configuration for a symmetric FIR filter in accordance with another aspect of the present invention.

Symmetric finite impulse response (FIR) filtering is widely used in wireless communications because of its linear phase response. Equation 1 shows the mathematics of symmetric FIR filtering. This filter is readily implemented by using a single loop-mode macro-operation. The hardware configuration is shown in FIG. 5a. The pseudo-code is listed below, where the numbering is common with FIG. 4c.

```
setup:   mov    macro_source_addr_reg_2,addr_x(n)
         mov    macro_source_addr_reg_3, addr_x(n-N+1)
         mov    macro_source_addr_reg_1, addr_h(0)
         mov    macro_in_reg_7, resolution_adjust
macro:   macro  [new][loop][counter=(N/2)][setting as in FIG. 4]
result:  mov    result_y(n), macro_out_reg_2
``` b. Adaptive FIR Filter/Discrete Mode Macro-Operation $$e(n-1) = d(n-1) - y(n-1) \quad \text{Equation 1}$$

$$C_k(n-1) = 2Be(n-1)x(n-1-k) \quad \text{Equation 3}$$

$$b_k(\text{Equation }1) + C_k(n-1) \quad \text{Equation 5}$$

$$y(n) = \sum_{k=0}^{N-1} b_k(n)x(n-k)$$

Figure 5B:
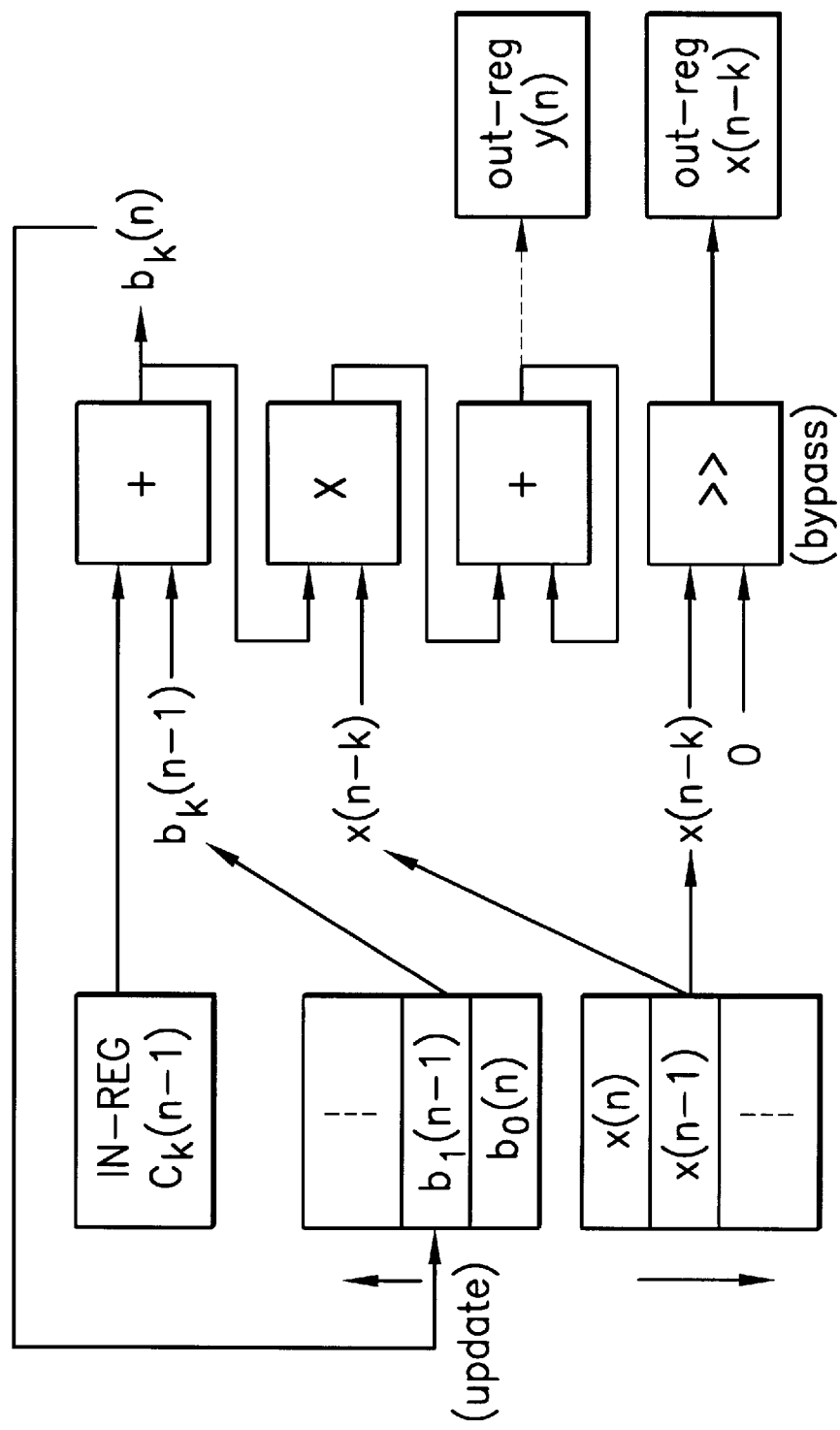
FIG. 5b illustrates a hardware configuration for an adaptive FIR filter in accordance with yet another aspect of the present invention.

Adaptive FIR filtering can require extensive computations to update the filter coefficients in real-time. Equation 2 through 5 show the required computations. To compute all equations, discrete mode is used to mix a macro-operation with several micro-operations in a loop. The hardware configuration is shown in FIG. 5b. Corresponding pseudo-code is listed below (numbering common with FIG. 4c):

```
set up:  mov    macro_source_addr_reg_3, addr_b0(n)
         mov    macro_source_addr_reg_1, addr_x(n)
         mov    macro_source_addr_reg_6, addr_x(n);
                shows data w/DMA IN
         mov    macro_source_addr_reg_7, constant_zero;
                by pass to get x(n-k) CH1
         mov    macro_dest_addr_reg_1, addr_b0(n);
                update coefficients
         sub    e(n-1), d(n-1), y(n-1); e(n-1)=d(n-1)-y(n-1)
         mult   e(n-1), e(n-1), 2B
         mult   macro_in_reg_2, e(n-1), x(n-1); calculate and
                                               store C0(N-1)
loop:
macro:   macro
         [new][discrete][counter=N][setting as in FIG. 5]
         mult   macro_in_reg_2, e(n-1), macro_out_reg_3;
                                  calculate and store C0(N-1) loop
```

```
        C0(N-1)
        jn_macro_counter_zero_flag; end loop
result: mov    result_y(n), macro_out_reg_2
```

Figure 6A:
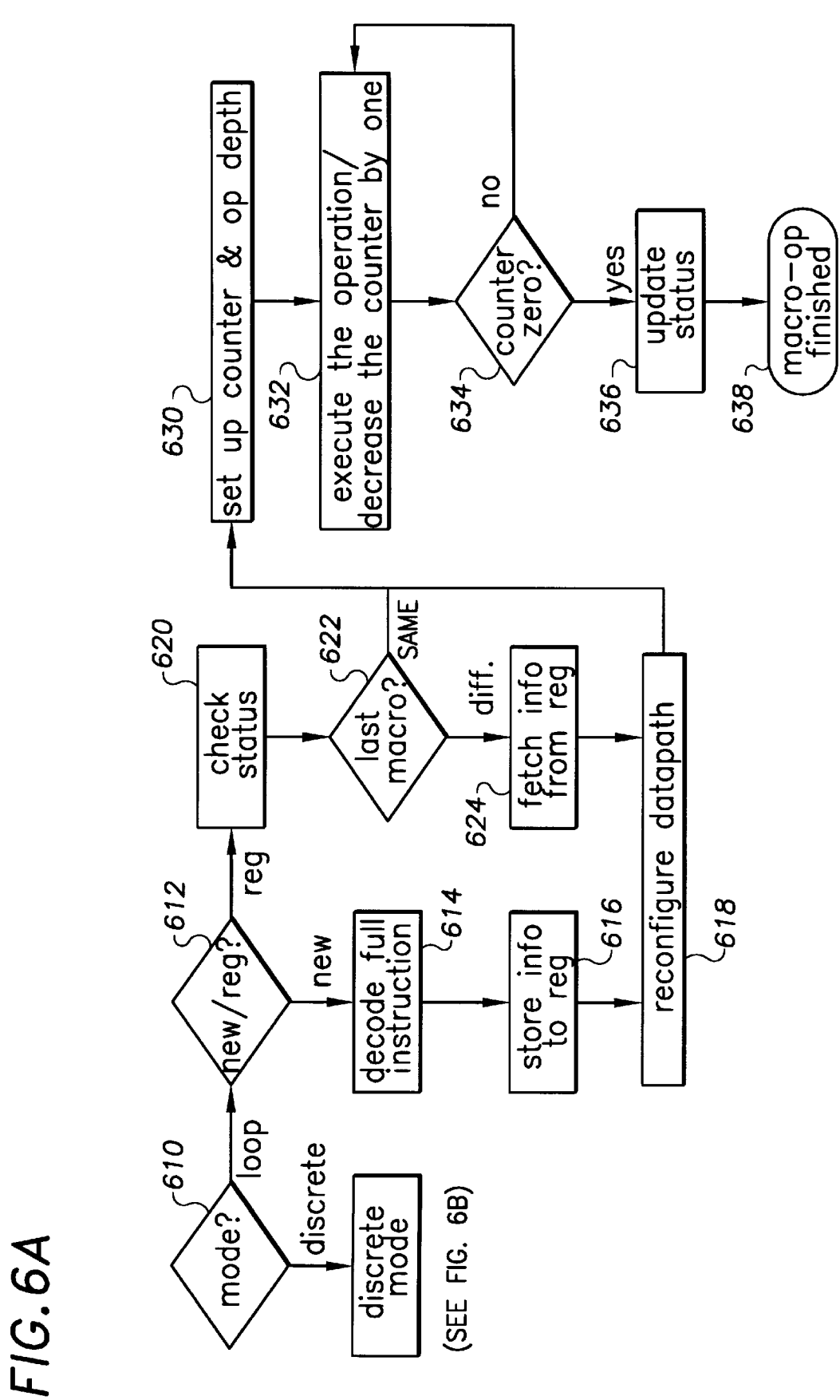
FIGS. 6a and 6b provide an example flow-chart illustrating an example flow, according to the present invention, of a portion of the architecture exemplified by FIGS. 4a and 4b and that may be used to generate, e.g., by a HDL, discrete hardware including such functionality.
Figure 6B:
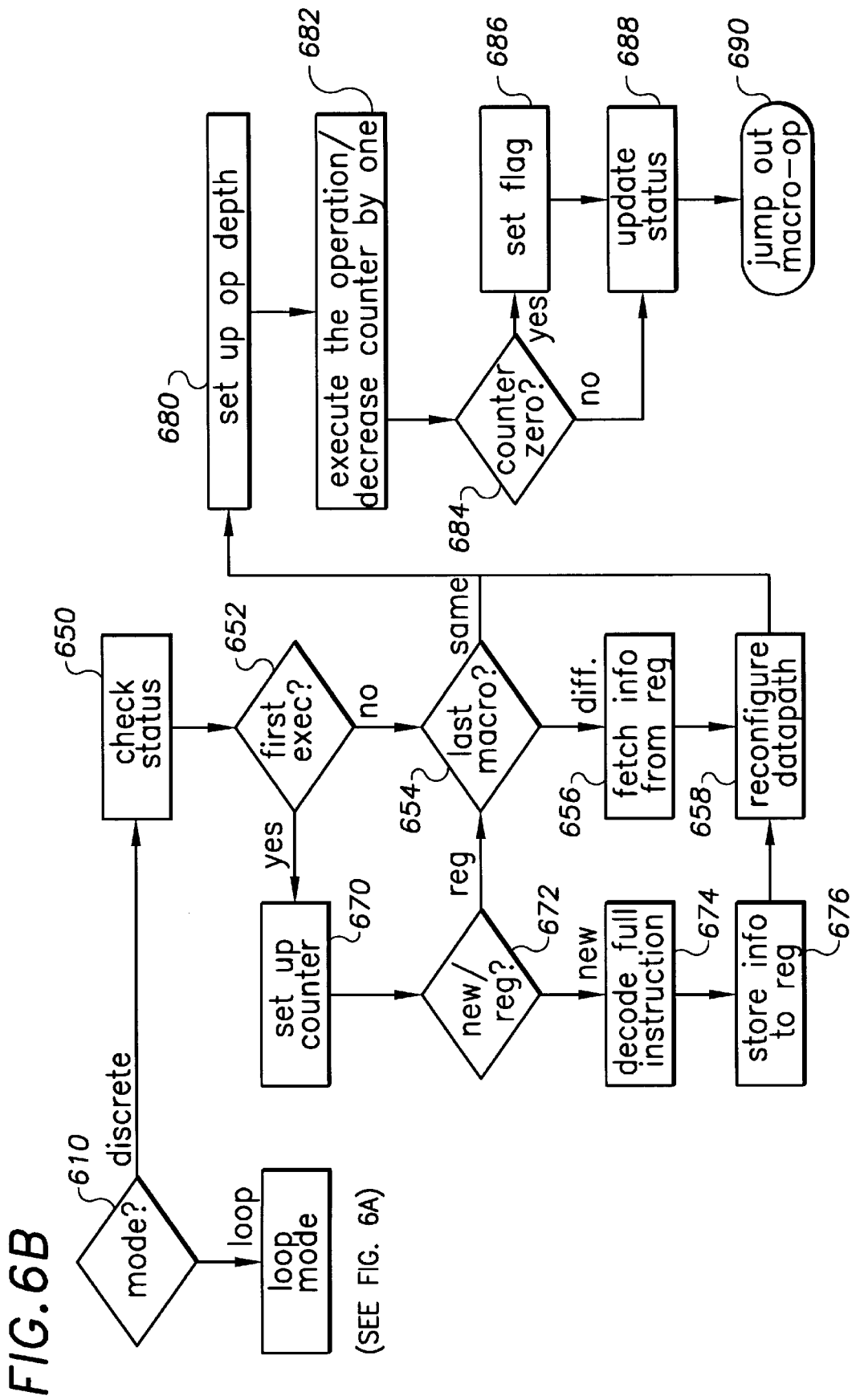

FIGS. 6a and 6b illustrate an example flow of operation for the management entity (ME) unit 140 of FIG. 4b. Using manual or automatized logic (such as Verilog HDL), this flow may be used to develop discrete hardware using, for example, the instruction format of FIG. 4d. Flow begins at blocks 610 and 612 where the ME unit determines whether the instruction mode of operation is discrete or loop, and, if the loop mode, new or stored. FIG. 6a describes the loop modes of operation, and FIG. 6b describes the discrete modes of operation.

Referring first to FIG. 6a, flow proceeds from block 612 to blocks 614, 616 and 618 if the instruction is new. In this instance, the full instruction is decoded (614) and stored in the decoded macro-operation instruction register circuitry (616). The ME unit then reconfigures the data path according to the information as decoded (618). If the instruction has already been stored, flow proceeds from block 612 to blocks 620 and 622, where the ME unit retrieves the status of the previously received macro-operation (620) and determines whether it is the same as, or different from, the current one (622). If it is different, flow proceeds to block 624 where the previous macro-operation information is retrieved from the decoded macro-operation instruction register circuitry, and then to block 618 for reconfiguration of the datapath.

From either block 618 or 622 (for the same macro-operation), flow proceeds to block 630 through block 638 for completion of the operation. At blocks 630 and 632, the ME unit configures the counter and the operational depth and then executes the operation with a decrement to the counter upon completion, as previously discussed. At block 634, the counter is compared to zero. If the counter has not reached zero, flow returns to block 632. If the counter has reached zero, flow proceeds from block 634 to block 636 where the ME unit updates the status of the operation. At block 638, the macro-operation is complete.

The flow of FIG. 6b is similar to the flow of FIG. 6a and the associated hardware can be implemented for optimization accordingly. Corresponding blocks include: 650 and 620, 654 and 622, 656 and 624, 658 and 618, 672 and 612, 674 and 614, 676 and 616, 682 and 632, 688 and 636, and 690 and 638. Unlike the flow of FIG. 6a, the discrete mode of FIG. 6a sets up the counter (670) immediately after determining that this is the first execution of a plurality, as indicated by the depth information field (652). If this is not the first execution, flow proceeds from block 652 to blocks 654, 656 and 658. From block 654 (if the same as the previous macro-operation) or block 658, flow proceeds to block 680 where the depth is configured in connection with the computational/multiplexing feedback path. From block 680, flow proceeds to block 682 for execution and decrementing the counter, and then to block 684 where the counter is compared to zero. If the counter has not reached zero, flow proceeds to block 688 where the ME unit updates the status of the operation. If the counter has reached zero, flow proceeds from block 684 to block 686 where a flag is set to record this condition, and then to block 688. At block 690, the macro-operation is complete.

The various embodiments described above are provided by way of illustration only and should not be construed to limit the invention. Those skilled in the art will readily recognize various modifications and changes which may be made to the present invention without strictly following the exemplary embodiments and applications illustrated and described herein. It will be understood, for example, that the example architecture arrangement can be modified, expanded or simplified to change and/or enhance the various structures and functions. Further, it will be appreciated that various types of main processing units may be used to interface with the example arrangement using an integrated approach with the main and macro units in one chip or in separate chips. The true spirit and scope of the present invention is set forth in the following claims.

What is claimed is:

1. A micro-computer circuit arrangement for executing instructions, comprising:
   a computational circuit;
   means for processing the instructions into computational codes and data management codes;
   a computational controller including multiple computational math blocks adapted to compute math functions in response to
      inputs fed back from outputs provided by the computational circuit,
      a first computational code that sets which of the inputs should be used, and
      a second computational code that sets a function for an exclusive one of the multiple computational math blocks; and
   a management processing circuit, responsive to the data management codes, for providing computational data to the computational circuit.

2. A circuit arrangement, as recited in claim 1, wherein the means for processing the instructions into computational codes and data management codes includes a first decoder arranged a decode the computational codes and a second decoder arranged to decode the data management codes.

3. A circuit arrangement, as recited in claim 2, wherein the first decoder and second decoder are configured and arranged as two separate but synchronized circuits arranged to operate in parallel.

4. A circuit arrangement, as recited in claim 3, wherein the multiple computational math blocks of the computational circuit include a multiplier, an arithmetic logic unit and a shifter.

5. A circuit arrangement, as recited in claim 1, wherein computational circuit includes a feedback path arranged to receive the outputs from the computational circuit and to provide the outputs as the inputs to the computational circuit.

6. A circuit arrangement, as recited in claim 5, further including sets of register files, at least one of which is assigned as an active set and is used to store data used by the computational circuit.

7. A circuit arrangement, as recited in claim 6, wherein the active set is swapped with another set designated as inactive, whereby the active set becomes designated as inactive and the inactive set is assigned as an active set.

8. A circuit arrangement, as recited in claim 7, further including a register memory circuit for storing a portion of a macro-operation instruction, the portion including configuration information for the computational circuit.

9. A circuit arrangement, as recited in claim 1, further including means for configuring the computational circuit for a predetermined number of execution cycles in response to one of the macro-operation instructions, wherein the predetermined number of execution cycles is greater than one.

10. A circuit arrangement, as recited in claim 1, wherein the computational circuit includes a multiplier, an arithmetic logic unit and a shifter, and wherein the computational controller is adapted to respond to one of computational codes by setting a function for the arithmetic logic unit.

11. A circuit arrangement, as recited in claim 10, wherein the computational controller is adapted to respond to one of computational codes by setting a function for the shifter.

12. A circuit arrangement, as recited in claim 1, wherein the computational circuit includes a multiplier, an arithmetic logic unit and a shifter, and wherein the computational controller is adapted to respond to one of computational codes by setting a function for the shifter.

13. A circuit arrangement, as recited in claim 1, wherein the computational circuit includes a multiplier, an arithmetic logic unit and a shifter, and wherein the computational controller is adapted to respond to one of computational codes by setting a function exclusively for the shifter.

14. A circuit arrangement, as recited in claim 1, wherein the computational circuit includes multiple computational math blocks selected from the set of a multiplier, an arithmetic logic unit and a shifter, and wherein the computational controller is adapted to respond to one of computational codes by setting a function for an exclusive one of the computational math blocks.

15. A circuit arrangement, as recited in claim 1, wherein computational circuit includes a feedback path arranged to receive outputs from the computational circuit and to provide the outputs as inputs to the computational circuit, and wherein the computational controller is adapted to respond to one of computational codes by setting which of the inputs should be used.

16. A circuit arrangement, as recited in claim 15, wherein the computational controller is adapted to respond to one of computational codes by configuring use of intermediate results by the computational circuit.

17. A circuit arrangement, as recited in claim 1, wherein the multiple computational math blocks include blocks selected from the set of a multiplier, an arithmetic logic unit and a shifter.

18. A circuit arrangement, as recited in claim 17, wherein the computational controller is adapted to respond to one of computational codes by configuring use of intermediate results by the computational circuit.

19. A method for executing instructions in a microcomputer circuit arrangement, the method comprising:
  storing computational data;
  processing the instructions as computational codes and data management codes;
  providing a computational circuit with outputs that are fed back as inputs to the computational circuit and configuring the computational circuit including responding to one of the computational codes by either setting which of the inputs should be used, or setting a function for an exclusive one of multiple computational math blocks;
  in response to the data management codes, transferring the computational data to the computational circuit; and
  in response to the steps of configuring and transferring, computing the computational data using the computational circuit.

20. A method for executing instructions in a microcomputer circuit arrangement, according to claim 19, wherein computing the computational data using the computational circuit further includes transferring data output from the computational circuit to an input register.

21. A method for executing instructions in a microcomputer circuit arrangement, according to claim 20, further including providing a data bank and using the data bank for transferring the data output from the computational circuit to the input register.

22. A method for executing instructions in a microcomputer circuit arrangement, according to claim 19, further including using a cache memory circuit to transfer computational data to and from the computational circuit.

23. A method for executing instructions in a microcomputer circuit arrangement, according to claim 22, further including synchronizing the use of the cache memory circuit and the computational circuit.

24. A method for executing instructions in a microcomputer circuit arrangement, according to claim 19, further including controlling the computational circuit according to the computational codes.

25. A method for executing instructions in a microcomputer arrangement, as recited in claim 19, wherein configuring the computational circuit includes, responsive to one of the computational codes, configuring at least one of multiple computational math blocks within the computational circuit by setting a function for an exclusive one of the multiple computational math blocks.

26. A method for executing instructions in a microcomputer arrangement, as recited in claim 19, wherein configuring a computational circuit includes responding to one of the computational codes by setting selected inputs of the computational circuit and wherein computing the computational data circuit includes providing some of the computational data in a feedback path around the computational circuit.

27. A method for executing instructions in a microcomputer arrangement, as recited in claim 19, wherein configuring a computational circuit includes responding to one of computational codes by configuring use of intermediate results by the computational circuit.

28. A method for executing instructions in a microcomputer arrangement, as recited in claim 19, wherein the computational circuit includes multiple computational math blocks selected from the set of a multiplier, an arithmetic logic unit and a shifter, and includes a feedback path feeding outputs from the computational circuit to inputs to the computational circuit, wherein configuring the computational circuit includes responding to a first computational code by setting which of the inputs should be used and to a second computational code by setting a function for an exclusive one of the multiple computational math blocks within the computational circuit.

29. A micro-computer circuit arrangement for executing instructions, comprising:
  input data storage circuit;
  output data storage circuit;
  a computational circuit with outputs that are fed back as inputs to the computational circuit;
  means for providing computational data to the input data storage circuit;
  means for processing the instructions as computational codes and data management codes;
  means, responsive to the computational codes, for configuring the computational circuit including responding to a first computational code by setting which of the inputs should be used, and responding to a second computational code by setting a function for an exclusive one of multiple computational math blocks; and
  means, responsive to the data management codes, for transferring data between the output data storage circuit and the input data storage circuit while using the computational circuit to compute the computational data.

30. A micro-computer circuit arrangement for executing instructions, according to claim 29, wherein the means for processing includes at least one of a program decoder configured and arranged to decode the data management codes, and a computational decoder configured and arranged to decode the computational codes.

31. A micro-computer circuit arrangement for executing encoded macro-operation instructions, according to claim 30, wherein the means for processing includes a data management unit.

32. A micro-computer circuit arrangement for executing instructions, according to claim 31, further including a storage register arranged to store configuration information decoded from an instruction and arranged to be subsequently accessed to alleviate the need for further decoding of configuration information upon receipt of additional instructions.

33. A micro-computer circuit arrangement including a computational circuit having outputs that are fed back as inputs to the computational circuit and adapted for executing instructions, comprising:

means for processing the instructions into computational codes and data management codes;

means, responsive to the computational codes, for configuring the computational circuit, including responding to a first computational code by setting which of the inputs should be used, and responding to a second computational code by setting a function for an exclusive one of multiple computational math blocks;

means, responsive to the data management codes, for transferring computational data to and from the computational circuit; and means, responsive to the configuring and transferring, for computing the computational data using the computational circuit.

34. A micro-computer circuit arrangement for executing instructions, comprising:

input data storage circuit;

output data storage circuit;

a computational circuit including multiple computational math blocks with outputs that are fed back as inputs to the computational circuit;

means for providing computational data to the input data storage circuit;

means for processing the instructions as computational codes and data management codes;

means, responsive to the computational codes, for configuring the computational circuit by responding to one of the computational codes by setting a function for an exclusive one of the multiple computational math blocks; and means, responsive to the data management codes, for transferring the computational data between the output data storage circuit and the input data storage circuit wherein the computational data from the input data storage circuit is used by the computational circuit to compute the computational data and passed to the output data storage circuit.

35. A micro-computer circuit arrangement for executing instructions, comprising:

input data storage circuit;

output data storage circuit;

a computational circuit with outputs that are fed back as inputs to the computational circuit;

means for providing computational data to the input data storage circuit;

means for processing the instructions as computational codes and data management codes;

means, responsive to the computational codes, for configuring the computational circuit by responding to one of the computational codes by setting which of the inputs should be used; and means, responsive to the data management codes, for transferring the computational data between the output data storage circuit and the input data storage circuit while using wherein the computational data from the input data storage circuit is used by the computational circuit to compute the computational data and passed to the output data storage circuit.

* * * * *